United States Patent
Zwier

(10) Patent No.: US 8,056,195 B2
(45) Date of Patent: Nov. 15, 2011

(54) LANDSCAPE EDGING CLIP

(75) Inventor: Daniel G. Zwier, Holland, MI (US)

(73) Assignee: Permaloc Corporation, Holland, MI (US)

( * ) Notice: Subject to any disclaimer, the term of this patent is extended or adjusted under 35 U.S.C. 154(b) by 870 days.

(21) Appl. No.: 12/079,210

(22) Filed: Mar. 25, 2008

(65) Prior Publication Data

US 2008/0235921 A1    Oct. 2, 2008

Related U.S. Application Data

(60) Provisional application No. 60/920,427, filed on Mar. 28, 2007.

(51) Int. Cl.
*A44B 99/00* (2010.01)
*A01G 1/08* (2006.01)

(52) U.S. Cl. ............................ 24/545; 52/102

(58) Field of Classification Search ............ 24/293–295, 24/545, 562, 570; 47/33; 52/102
See application file for complete search history.

(56) References Cited

U.S. PATENT DOCUMENTS

| | | | | |
|---|---|---|---|---|
| 303,755 A * | 8/1884 | Schwartz et al. | ............. | 24/67 R |
| 1,653,465 A * | 12/1927 | Montan et al. | .................. | 24/562 |
| 2,000,259 A * | 5/1935 | Smith | ................. | 16/10 |
| 3,208,119 A * | 9/1965 | Seckerson | ........................ | 24/562 |
| 3,962,758 A * | 6/1976 | Knappe et al. | ................... | 24/562 |
| 5,421,118 A * | 6/1995 | Bauer | ................. | 47/33 |
| 5,598,609 A * | 2/1997 | Asami | ............................. | 24/295 |
| 6,671,934 B2 * | 1/2004 | Wenzlick et al. | ............... | 24/295 |
| 2001/0032377 A1 * | 10/2001 | Lubera et al. | ................... | 24/293 |

* cited by examiner

*Primary Examiner* — Robert Sandy
(74) *Attorney, Agent, or Firm* — Flynn, Thiel, Boutell & Tanis, P.C.

(57) ABSTRACT

A U-shaped clip that is configured to be quickly installed by attaching the clip over the top edge of the vertical wall defined by plural end to end oriented landscape edging restraint members. This action is quick and easily accomplished by hand, requiring no tools or forceful effort. The clip is made of a material having a hardness characteristic that is harder than the material of the edging restraint members. The clip includes a series of pointed, opposing, hardened steel barbs that bite into the softer edging material to create a mechanical lock. Further, the barbs are angled so as to increase the force applied to the edging material as the parts are drawn apart in opposite directions.

5 Claims, 3 Drawing Sheets

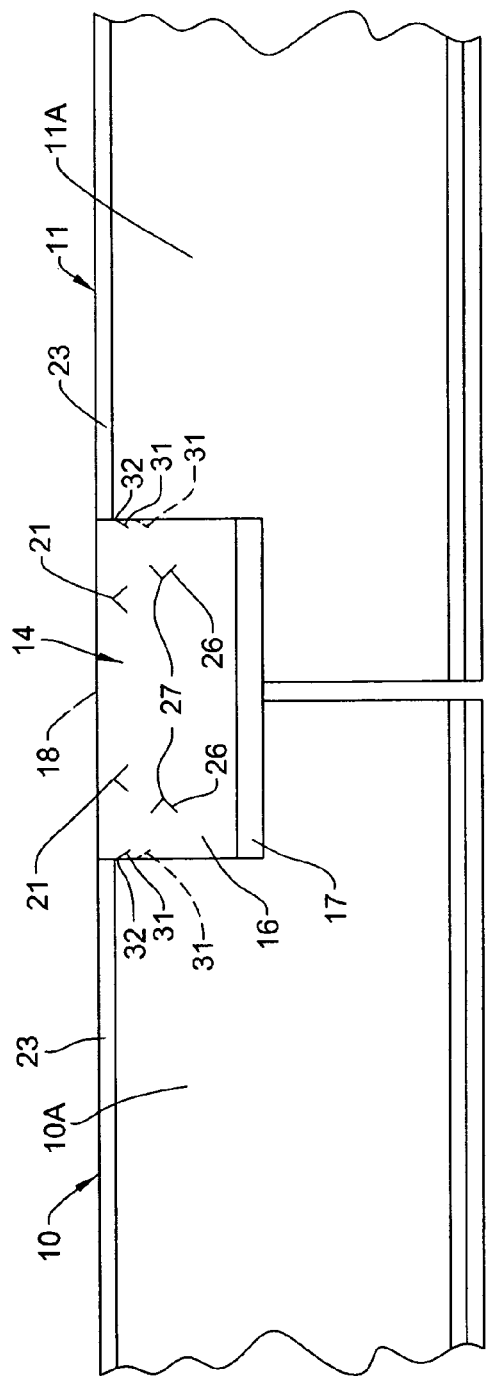
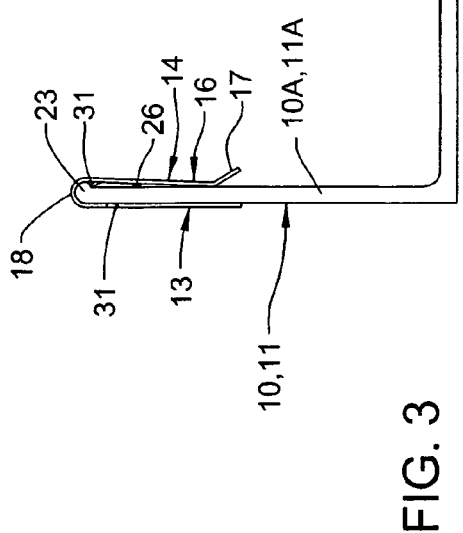
FIG. 2
FIG. 3

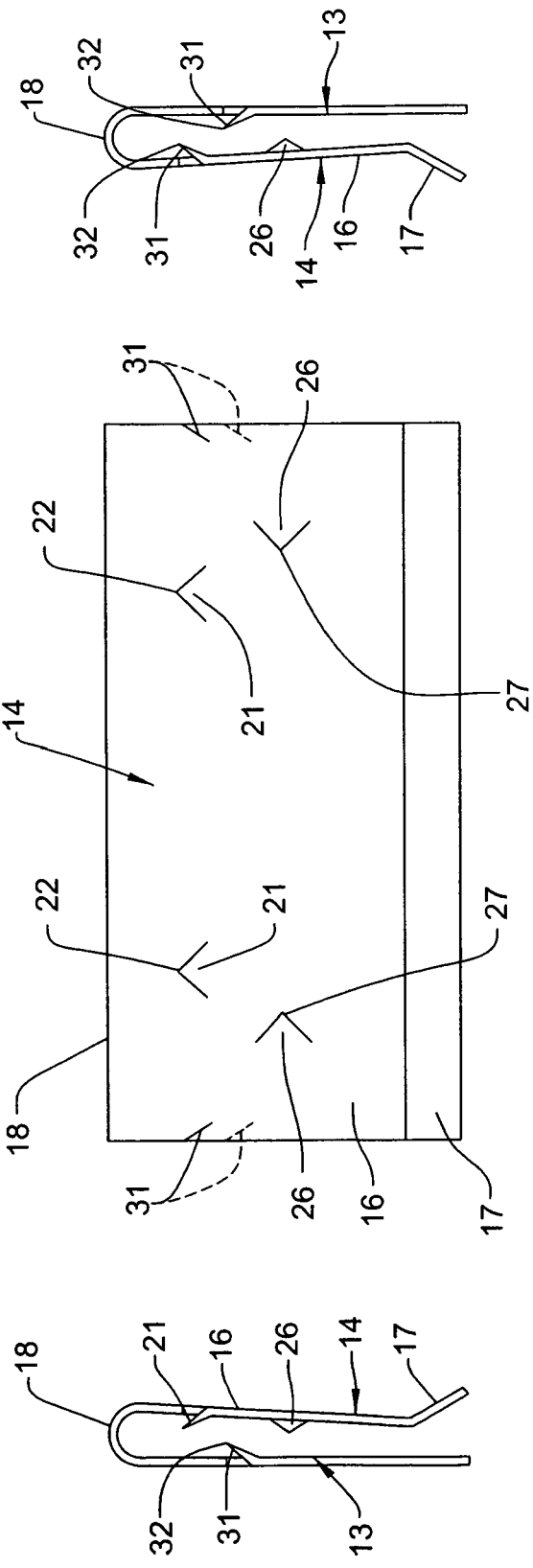

LANDSCAPE EDGING CLIP

CROSS REFERENCE TO RELATED APPLICATIONS

This application claims the benefit of U.S. Provisional Application No. 60/920,427, filed Mar. 28, 2007.

FIELD OF THE INVENTION

This invention relates to a device for interconnecting end to end landscape or hardscape edging strips, also known as edge restraints.

BACKGROUND OF THE INVENTION

This invention was born from the need to quickly and firmly attach longitudinal restraint sections of edging material for landscape and particularly hardscape applications. Edge restraints are a critical element in the construction of interlocking pavement and other hardscape constructions. They perform the mechanical function of restraining the perimeter of the hardscape so as to prevent lateral shifting and separation of the hardscape materials.

Typical edge systems are often constructed of multiple lengths of edging materials that must be joined together to form a continuous length of restraint. The point of connection between adjacent sections is, mechanically, the weakest point in the system and generates an increased labor cost to properly install.

Although many edging systems currently incorporate some type of connection system, these connections are limited in that they are either permanently affixed to the end of the edging lengths, being rendered useless when edging sections must be cut to a shorter length, or are secondary systems that require additional hardware and are labor intensive to install. Some of the existing systems that incorporate a mechanical fastening device use nuts and bolts that protrude from the face of the edging materials creating an obstruction so that the paving material is prevented from being installed flush to the paving restraint device. Further, many of these systems are designed as a wedge type, friction fit. As is well known, the landscape is a dynamic constantly moving environment that will quickly cause failure of a connection based upon friction as the sole means of binding.

Therefore, it is an object of this invention to provide a new thin profile connection system that provides a strong, secure connection which is quick and easy to install. This system is mechanically secure for securing the edging materials together and allowing the paving materials to be installed directly adjacent to the paving restraint, while decreasing labor and expense.

SUMMARY OF THE INVENTION

The objects and purposes of this invention are met by providing a U-shaped clip that can be quickly installed by attaching the clip over the top edge of the vertical wall of the restraint. This action is quick and easily accomplished by hand, requiring no tools or forceful effort. The clip forms a strong connection through the use of a series of pointed, opposing, hardened steel barbs that bite into the softer edging material to create a mechanical lock. Further, the barbs are angled so as to increase the force applied to the edging material as the parts are drawn apart in opposite directions.

BRIEF DESCRIPTION OF THE DRAWINGS

Other objects and purposes of this invention will be apparent to persons acquainted with apparatus of this general type upon reading the following specification and inspecting the accompanying drawings, in which:

FIG. 2 is a side view of the edge restraints and clip shown in FIG. 1 and wherein the interconnection of the edge restraints is complete;

FIG. 3 is an edge view of the edge restraint assembly shown in FIG. 2;

FIG. 4 is a left edge view of the U-shaped clip;

FIG. 5 is a side view of the U-shaped clip; and

FIG. 6 is a right edge view of the U-shaped clip.

DETAILED DESCRIPTION

Figure 1:
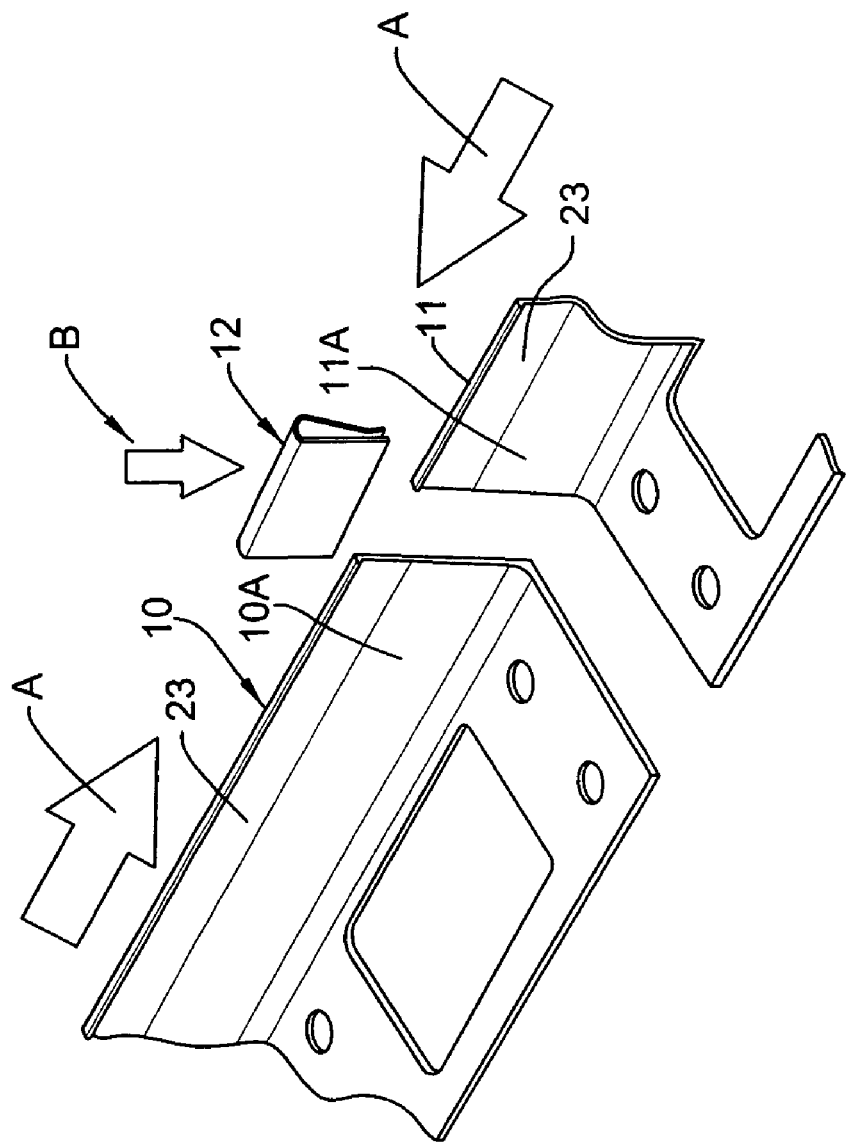
FIG. 1 is an isometric view of end to end oriented landscape edging strips or edge restraints configured to be joined together by a U-shaped clip embodying the invention.

FIG. 1 illustrates two L-shaped landscape edging strips, or edge restraints 10 and 11 oriented end to end. While FIG. 1 illustrates the strips 10 and 11 being separated from one another by a finite distance, the arrows "A" are to signify that the edging strips are to be moved toward one another until there is a minimal gap therebetween as shown in FIG. 2 so that thereafter a U-shaped clip 12 can be slid into overlapping engagement with the vertical leg of each of the two strips to effect a connecting of the two strips together by the clip. That is, one half of the clip 12 overlaps the vertical leg 10A of the strip 10 while the other half of the clip overlaps the vertical leg 11A of the strip 11 as shown in FIG. 2.

FIGS. 4-6 illustrate the clip 12 per se. As shown, the U-shaped clip 12 is generally of a rectangular configuration (see FIG. 5) and is made of spring steel that has been heat treated to a Rockwell C hardness value of 40-49. The clip can be made of one of a stainless steel and any form of a coated steel, such as a zinc coated steel. The hardness value has been chosen to be harder than any of the edge restraint materials being used therewith, such as aluminum, plastic and rubber. The wall thickness of the steel is approximately 0.015 inches. The left leg 13 of the U-shaped clip illustrated in FIG. 3 is flat whereas the right leg 14 contains two flat sections 16 and 17 forming an obtuse angle therebetween. The leg section 16 is contained in a plane that is inclined at an acute angle to the plane of the leg 13 with the upper edges of the legs 13 and 16 being integrally joined together by an arcuate section 18 so that the upper edges of the legs 13 and 16 are spaced further apart as compared to the spacing between the lower edge of the section 16 and the plane of the leg 13. The section 17 extends inclined outwardly from the lower edge of the section 16 to a terminal edge that is spaced from the lower terminal edge of the leg 13 by a distance that is approximately equal to the outer diameter of the arcuate section 18 at the top edge of the clip 12.

The leg 16 of the U-shaped clip has a plurality of inwardly punched out tabs forming pointed and sharp barbs or burrs extending into the interior space between the legs 13 and 16. A first set of punched out barbs 21 are formed so that a pointed end 22 on each thereof points upwardly and are configured to dig into the material of the vertical leg of the edging strip and engage a lower edge of a thicker top lip portion 23 of the vertical legs 10A and 11A. A second set of punched out barbs 26 are formed so that a pointed end 27 on each thereof points toward each other and are configured to dig into the material of the vertical leg of the respective edging strip at a location below the points of engagement of the barbs 21 with the vertical legs. A third set of punched out barbs 31 are formed on the opposite lateral edges of the legs 13 and 16 and are formed so that a pointed end 32 points upwardly and are configured to dig into the material on the opposite sides of the vertical leg of the respective edging strip.

During installation of the clip 12 over the upper edges of the two end to end aligned edge restraints 10 and 11, the leg 13 is configured to operatively engage the outside facing vertical face of the L-shaped edge restraints 10 and 11 as shown in FIG. 3 or the clip can be arranged the other way around, namely, the leg 13 can be positioned to operatively engage the inside facing vertical face of the L-shaped edge restraints 10 and 11. The under side of the wall segment 17 will engage the upper edge form 23 of the edge restraints 10 and 11 and, in response to a downward force in the direction of the arrow "B" shown in FIG. 1, the leg sections 16 and 17 will elastically flex outwardly against the urging of the spring force of the spring steel to allow passage of the section 17 over the upper edge form 23 between the leg sections 13 and 16, 17. The direction that the pointed barbs 21, 26 and 31 point facilitates the movement of the leg sections 13 and 16, 17 over the inside and outside facing surfaces of the vertical legs of the L-shaped edge restraints. The barbs 21 act to simultaneously restrict a movement of the clip relative to the edge restraints 10 and 11 and in a direction opposite to the arrow "B" due to the resilient return force of the spring steel causing the pointed ends of the barbs to dig into the softer material of the edge restraints. Similarly, the barbs 26 restrict a relative movement of the clip 12 lengthwise with respect to the edge restraints. The barbs 31 oriented on both legs 13 and 16 also serve to restrict movement of the clip 12 in a direction opposite to the arrow "B". The barbs 31 on the leg 16 will, like the barbs 21, engage the bottom edge of the slightly enlarged upper edge form 23 while the barbs 31 on the leg 13 dig into the softer material of the edge restraint. It is to be understood that the edge restraints 10 and 11 can be made without the enlarged upper edge form 23.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An assembly for connecting two elongate landscape edging restraints end-to-end, comprising:
   at least a pair of elongate edging restraints having a first hardness value;
   a one piece U-shaped clip having a first leg member having a first surface, a second leg member having a second surface opposing said first surface, and a bight member integrally interconnecting said first and second leg members together along respective adjacent edges thereof, said one piece U-shaped clip being made of a material having a second hardness value harder than a material of said restraints; and
   a plurality of pointed barbs on said first and second surfaces and extending into a region between said opposing first and second surfaces, pointed ends of said barbs being configured to slide over said material of said restraints when moved relative to said restraints in a first direction and dig into said material of said restraints when moved relative to said restraints in a second direction different from said first direction.

2. The assembly according to claim 1, wherein said material of said U-shaped clip is a spring steel, a spacing between said adjacent edges to which said bight member is integrally connected to said first and second leg members is wider than a spacing of edges of said first and second leg members remote from said bight member.

3. The assembly according to claim 2, wherein a thickness of said edging restraint is greater than a spacing between said pointed ends on respective said barbs on said first and second surfaces.

4. The assembly according to claim 1, wherein said U-shaped clip is made of zinc coated spring steel having a Rockwell C hardness value of 40-49.

5. The assembly according to claim 1, wherein said first leg member of said U-shaped clip is flat and wherein said second leg member is composed of two flat sections, a first of said flat sections being inclined at an acute angle from said bight member toward said first leg member and a second of said flat sections extending away from said first flat section and said first leg member so as to define an obtuse angle between said first and second flat sections.

\* \* \* \* \*